United States Patent
Busch-Sorensen (10) Patent No.: US 8,902,073 B2
(45) Date of Patent: Dec. 2, 2014

(54) SMARTCARD PROTECTION DEVICE

(75) Inventor: Thomas Busch-Sorensen, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 607 days.

(21) Appl. No.: 12/702,170

(22) Filed: Feb. 8, 2010

(65) Prior Publication Data

US 2010/0201534 A1 Aug. 12, 2010

Related U.S. Application Data

(60) Provisional application No. 61/151,475, filed on Feb. 10, 2009.

(51) Int. Cl.

| | |
|---|---|
| *G08B 13/14* | (2006.01) |
| *G08B 21/00* | (2006.01) |
| *H04Q 5/22* | (2006.01) |
| *H04B 5/00* | (2006.01) |
| *G01R 11/56* | (2006.01) |
| *G01S 13/00* | (2006.01) |
| *G06K 19/073* | (2006.01) |

(52) U.S. Cl.
CPC .............................. *G06K 19/07336* (2013.01)
USPC .. 340/657; 340/10.1; 340/572.1; 340/539.22; 340/686.1; 340/568.2; 455/41.1; 455/41.2; 705/412; 705/40; 342/187

(58) Field of Classification Search
USPC ........ 340/657, 5.2, 572.1, 10.1–10.9, 539.22; 705/412, 40; 342/187
See application file for complete search history.

(56) References Cited

U.S. PATENT DOCUMENTS 4,302,846 A * 11/1981 Stephen et al. ................. 455/19
5,103,209 A * 4/1992 Lizzi et al. ................. 340/572.4

(Continued)

FOREIGN PATENT DOCUMENTS

| DE | 102006008345 B3 | 8/2007 |
|---|---|---|
| EP | 1681779 A2 | 7/2006 |

(Continued)

OTHER PUBLICATIONS

Swedberg, Claire, "RFID Detector Offers Low-Cost Troubleshooting Device", RFID Journal, Mar. 2, 2009, found online at http://www.rfidjournal.com/article/print/4646, 2 pages.

(Continued)

*Primary Examiner* — Fekadeselassie Girma
(74) *Attorney, Agent, or Firm* — Kilpatrick Townsend & Stockton LLP (57) ABSTRACT

A card protection device and method of protecting data stored on a contactless smartcard are disclosed. The card protection device may include an antenna, a detector circuit, and an alerting circuit. The antenna may include a magnetic loop that is coupled to a tuning circuit responsive to magnetic field emissions in a frequency band associated with contactless smartcard communications. The detector circuit is coupled to the antenna and may include control logic for attenuating the magnetic field emissions based on smartcard operating characteristics. The detector circuit can store energy associated with the magnetic field emissions and the alerting circuit can provide an audible and/or visual alert using the stored energy. Optionally, the card protection device may be integrated with other smartcard communication functions and/or it may share components with a contactless smartcard.

24 Claims, 9 Drawing Sheets

(56) References Cited

U.S. PATENT DOCUMENTS

| | | | |
|---|---|---|---|
| 6,577,238 B1 * | 6/2003 | Whitesmith et al. | 340/572.1 |
| 6,753,783 B2 * | 6/2004 | Friedman et al. | 340/573.7 |
| 2002/0086643 A1 * | 7/2002 | Leipala | 455/80 |
| 2003/0189489 A1 * | 10/2003 | How | 340/572.6 |
| 2004/0213169 A1 * | 10/2004 | Allard et al. | 370/276 |
| 2006/0293027 A1 * | 12/2006 | Hammad et al. | 455/410 |
| 2007/0008140 A1 * | 1/2007 | Saarisalo et al. | 340/572.7 |
| 2007/0096924 A1 * | 5/2007 | Horne | 340/572.8 |
| 2007/0232232 A1 * | 10/2007 | Matsuo et al. | 455/41.1 |
| 2007/0257800 A1 * | 11/2007 | Yang et al. | 340/572.7 |
| 2008/0000987 A1 * | 1/2008 | Augustinowicz et al. | 235/492 |
| 2008/0197973 A1 * | 8/2008 | Enguent | 340/10.1 |
| 2008/0220721 A1 | 9/2008 | Downie et al. | |
| 2008/0252254 A1 * | 10/2008 | Osada | 320/108 |
| 2009/0065575 A1 * | 3/2009 | Phillips et al. | 235/380 |
| 2009/0096580 A1 * | 4/2009 | Paananen | 340/10.1 |
| 2009/0121843 A1 * | 5/2009 | Bauchot et al. | 340/10.31 |
| 2009/0152364 A1 | 6/2009 | Spivey, Jr. | |
| 2009/0167495 A1 * | 7/2009 | Smith et al. | 340/10.1 |
| 2012/0112887 A1 * | 5/2012 | Horne et al. | 340/10.1 |

FOREIGN PATENT DOCUMENTS

| | | | |
|---|---|---|---|
| EP | 1760641 A2 | 3/2007 | |
| FR | 2929430 A1 | 10/2009 | |
| WO | WO 01/22359 A1 | 3/2001 | |

OTHER PUBLICATIONS

Author Unknown, "Terminals", found online on Feb. 19, 2010 at: http://www.ask.fr/uk/products_and_services/terminals.html, 2 pages.

Press Release, "Spivey Technologies, LLC Announces 'Dead Bolt' Integrated Contactless RFID Security Technology is now available", found online at: http://www.1888pressrelease.com/spivey-technologies-llc-announces-dead-bolt-integrated-co-pr-179688.html, dated Jan. 22, 2010, 2 pages.

Kirschenbaum, Ilan, et al., "How To Build A Low-Cost, Extended-Range RFID Skimmer", dated Feb. 2, 2006, 22 pages.

PCT International Search Report and Written Opinion mailed Jun. 4, 2010; International Application No. PCT/US2010/023616, 13 pages.

European Patent Office examination communication dated Dec. 5, 2013 for European Application No. 10704462.0, 8 pages.

Australian Patent Office examination report dated Mar. 14, 2014 for Australian Patent Application No. 2010213888, 4 pages.

European Patent Office examination communication dated Apr. 28, 2014 for European Application No. 10704462.0, 8 pages.

* cited by examiner

SMARTCARD PROTECTION DEVICE

CROSS-REFERENCE TO RELATED APPLICATION

This application claims the benefit of and is a non-provisional of U.S. Provisional Patent Application 61/151,475, filed Feb. 10, 2009, which is incorporated herein by reference for all purposes.

BACKGROUND

The present application relates generally to communications and, more particularly, to communication with contactless smartcards.

Contactless smartcards are widely used to purchase goods and services. For example, it is now possible to pay for gasoline, groceries, and transit fares simply by waving a contactless smartcard in the vicinity of a card reader. Contactless smartcards provide the cardholder with a quick and convenient way to transfer value.

A contactless smartcard communicates with a card reader using electromagnetic radiation. Card transactions typically involve an over-the-air exchange of information such as account numbers and card identifiers. These exchanges may be susceptible to eavesdropping which can lead to hacking the smartcard and possibly the theft of its value.

Data encryption can help to reduce the incidence of hacking attacks. However, encryption algorithms are not effective in every situation and may be susceptible to unforeseen weaknesses. Moreover, there is a large body of unencrypted or weakly encrypted cards now in circulation.

BRIEF SUMMARY

A card protection device and method of protecting data stored on a contactless smartcard are disclosed. The card protection device may include an antenna, a detector circuit, and an alerting circuit. The antenna may include a magnetic loop that is coupled to a tuning circuit responsive to magnetic field emissions in a frequency band associated with contactless smartcard communications. The detector circuit is coupled to the antenna and may include control logic for attenuating the magnetic field emissions based on smartcard operating characteristics. The detector circuit can store energy associated with the magnetic field emissions and the alerting circuit can provide an audible and/or visual alert using the stored energy. Optionally, the card protection device may be integrated with other smartcard communication functions and/or it may share components with a contactless smartcard.

In one embodiment, a card protection device is disclosed. The card protection device includes an antenna coupled to a tuning circuit that is responsive to magnetic field emissions in a frequency band associated with contactless smartcard communications. A detector circuit is coupled to the antenna and stores energy associated with the magnetic field emissions. An alerting circuit provides an audible and/or visual alert responsive to the magnetic field emissions using the stored energy of the detector circuit. The alerting circuit can provide the audible and/or visual alert in response to the magnetic field emissions exceeding a threshold value and may vary the alert based on the strength of the magnetic field emissions.

In another embodiment, a method of detecting access to a contactless smartcard is disclosed. The method includes detecting magnetic field emissions in a frequency band associated with smartcard communications with a detecting device. The method also includes storing energy associated with the magnetic field emissions at the detecting device and generating an audible and/or visual alert in response to the magnetic field emissions using the stored energy. The method may include attenuating the magnetic field emissions for a time related to a contactless smartcard communication (CSC) protocol such as the time required to access data stored by the contactless smartcard.

In still another embodiment, a smartcard protection device is disclosed. The smartcard protection device includes an antenna configured to receive magnetic field emissions in a frequency band used for communicating with a card reader. A detector circuit is coupled to the antenna and stores energy associated with the magnetic field emissions. A communications module is coupled to the antenna and modulates the magnetic field emissions according to a contactless smartcard communication protocol. An alerting circuit generates an audible and/or visual alert using the stored energy of the detector circuit.

In a further embodiment, a smartcard device is disclosed. The smartcard device includes an integrated circuit and an antenna that receives magnetic field emissions in a frequency band used for communication with a contactless smartcard reader. The integrated circuit is coupled to the antenna and configured to detect a modulation of the magnetic field emissions according to a contactless smartcard communication (CSC) protocol. The integrated circuit drives an alerting circuit to produce an audible and/or visual alert responsive to the magnetic field emissions in a first operating mode, and load modulates the magnetic field emissions with card data in a second operating mode. Load modulation can be suspended in the first operating mode and, optionally, the first operating mode may continue until a user input is received or until the magnetic field emissions abate.

Additional aspects of the invention will become apparent in the course of the following description and with reference to the accompanying drawings.

In the figures, similar components and/or features may have the same reference label. In some cases, components of the same type are identified by following the reference label with a dash and a second label that further distinguishes among the similar components. If only the first reference label is used, the description is applicable to any of the similar components designated by the first reference label.

DETAILED DESCRIPTION

The ensuing description provides preferred exemplary embodiment(s) only, and such preferred exemplary embodiments are not intended to limit the scope or applicability of the present invention. Rather, the ensuing description will enable those who are skilled in the art to implement such preferred exemplary embodiment(s). Persons of skill in the art will recognize that various changes may be made in the function and arrangement of elements without departing from the spirit and scope of the invention as set forth in the appended claims.

Figure 1:
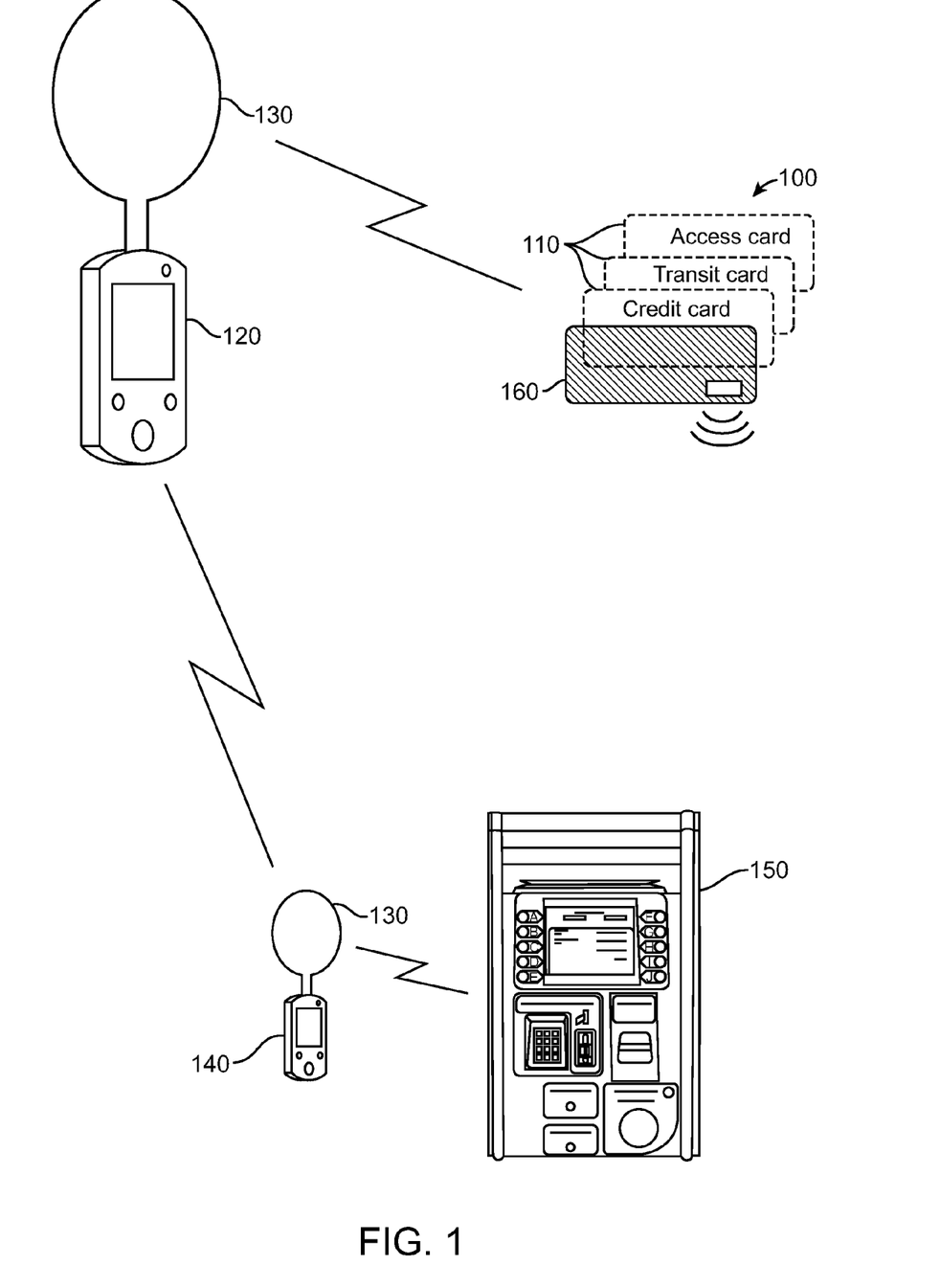
FIG. 1 shows an exemplary operation of a card protection device.

FIG. 1 shows a system 100 in which a cardholder is alerted when an attempt is made to access a contactless smartcard 110. Contactless smartcards 110 (also referred to as "cards" or "smartcards") store data which can be accessed wirelessly for conducting different types of transactions. As illustrated, cards 110 may include contactless credit cards, fare cards, building access cards, identification cards, etc. Card data may include account numbers, account balances, usage information, security codes, personal identifiers, and other potentially sensitive information.

Smartcards 110 communicate with a card reader by modulating its magnetic field emissions according to a contactless smartcard communication (CSC) protocol. To conduct a transaction, the cardholder waives a smartcard 110 in the vicinity of the card reader. The card reader accesses the stored data and may write updated information back to the card. For example, a cardholder may present a contactless credit card at a point-of-sale (POS) terminal or vending machine to buy goods or services. During the sales transaction, the card reader accesses account information from the card and uses it to complete the purchase.

Because smartcards 110 may respond automatically to external magnetic fields, card data is susceptible to unauthorized access. Unauthorized access can involve the theft or malicious destruction of card data. Two primary types of unauthorized access include skimming and relay attacks. Skimming refers to a process by which card data is obtained either by accessing a card directly or by intercepting communications between a card and a card reader. Relay attacks involve conducting an unauthorized transaction using card data. Absent some form of protection, data stored by a contactless smartcard can be accessed in a relatively short period of time and without any warning to the cardholder.

In the figure, two hackers cooperate to carry out a relay attack on a smartcard 110. A first hacker utilizes a card reader 120 to generate polling signals with which to elicit a response from smartcards in its immediate vicinity. The polling signals may conform with a physical layer CSC protocol, such as that specified by the ISO 14443 standards, and may implement an anti-collision process for selecting among multiple responses. An antenna 130 coupled to card reader 120 directs the polling signal towards smartcards 110.

As part of the attack, the first hacker relays information from a responding smartcard 110 to a card emulator 140 operated by the second hacker. The card emulator 140 sends the relayed information via its antenna 130 to a vending machine 150 to initiate a transaction. Thereafter, card reader 120 and card emulator 140 pass information between the responding smartcard 110 and the vending machine 150 to complete the unauthorized transaction. Note that, in the relay attack scenario shown, data encryption will not protect the cardholder as the hackers need not know exactly what data is being transferred. Also, because there is no physical contact, the cardholder may be completely unaware that his or her private data is being used to conduct a fraudulent transaction. Consequently, the hackers may escape detection.

Card protection device 160 alerts a cardholder to the unauthorized access and may temporarily block access to card data. In various embodiments, card protection device 160 provides an audible and/or visual alert when access to card data is detected. This may include beeping, buzzing, vibrating, flashing, or any other manner of warning a cardholder that an attempt could be underway to access card data. The alert may provide the cardholder with an opportunity to move away from a suspicious area and/or to notify authorities of a suspicious person.

Card protection device 160 can also disrupt access to card data. This may include attenuating magnetic field strength in the vicinity of smartcards 110. The attenuation can be based on card operating levels and/or timing requirements for accessing card data according to various CSC protocols. For example, in some embodiments, card protection device 160 absorbs energy from an external field thereby reducing the magnetic coupling with smartcards 110. The stored energy can be used to generate the alert thus avoiding the need for a battery or other power source. Attenuation can be based on smartcard operating levels and real-world operating scenarios. In other embodiments, the communication capability of a smartcard 110 may be temporarily disabled when an access attempt is detected pending authorization from the cardholder. For example, card operations may be suspended until a button is pressed or some other action is taken.

Card protection device 160 can be a separate device which is carried with other cards 110. For example, in some embodiments, card protection device 160 is designed to be stacked with other cards and carried in a wallet or purse. Card protection device 160 may also be integrated with cards 110 to present a combined functionality. This can include, for example, sharing an antenna or other smartcard components and/or providing an integrated circuit having both smartcard communications and data protection capabilities. Many variations are possible within the scope of the present invention.

Figure 2A:
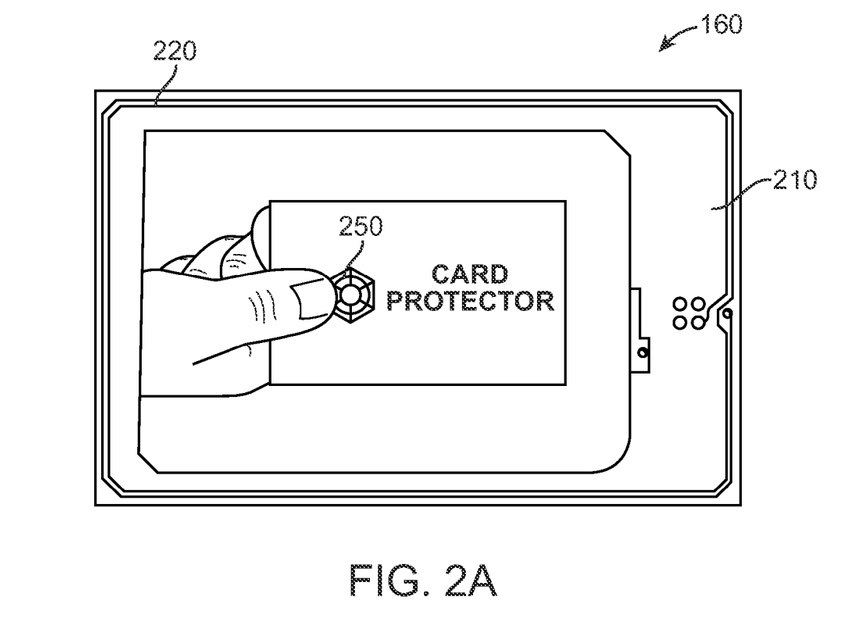
FIGS. 2A-2B show aspects of an exemplary card protection device.
Figure 2B:
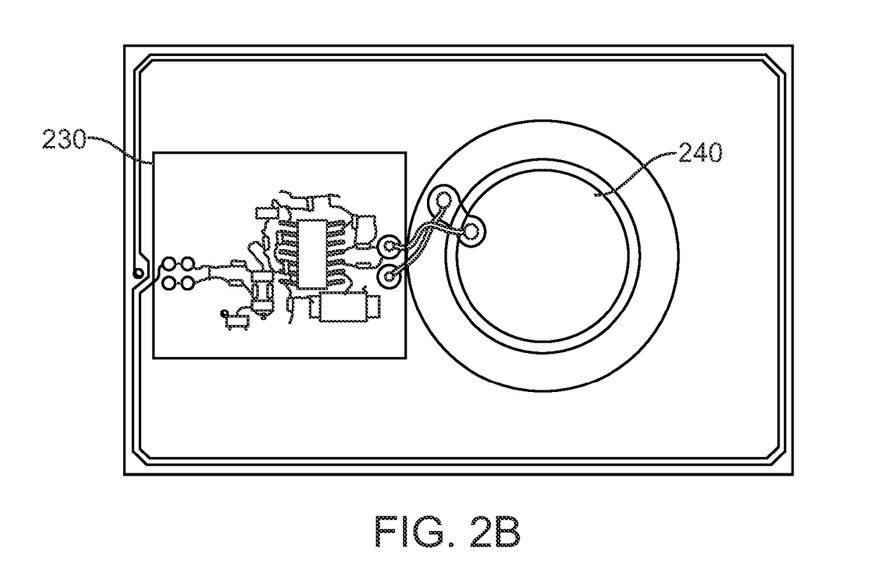

FIGS. 2A-2B show one embodiment of a card protection device 160. Card protection device 160 can be sized according to the ISO/IEC 7810 standards for smartcards and may have a length of approximately 85.60 mm and a width of approximately 53.98 mm. A printed circuit element 210 provides support for device electronics 230. Printed circuit element 210 can be mounted to a flexible substrate to withstand the stress of being carried with smartcards 110 in a purse or wallet. A magnetic loop antenna 220 can be etched into or otherwise attached to printed circuit element 210 and adapted to receive magnetic field emissions in a frequency band associated with smartcard communications. For example, magnetic loop antenna 220 may be optimized for 13.56 MHz communications used with ISO 14443 cards, or it may be adapted for use with other smartcard operating frequencies.

Electronics 230 can be mounted to printed circuit element 210 and can respond to magnetic field emissions. In various embodiments, electronics 230 include an energy storage element and control logic that is configured to absorb energy from ambient magnetic fields. A piezo-electric buzzer 240 may be coupled to electronics 230 to provide an audible alert when magnetic field emissions are detected. As shown, piezo-electric buzzer 240 is disposed in a Helmholz resonator cavity 250 which can be tuned to its piezo-resonance frequency. When the targeted emissions are detected, piezo-electric buzzer 240 emits an audible alert to warn a cardholder of a possible access attempt.

Figure 3:
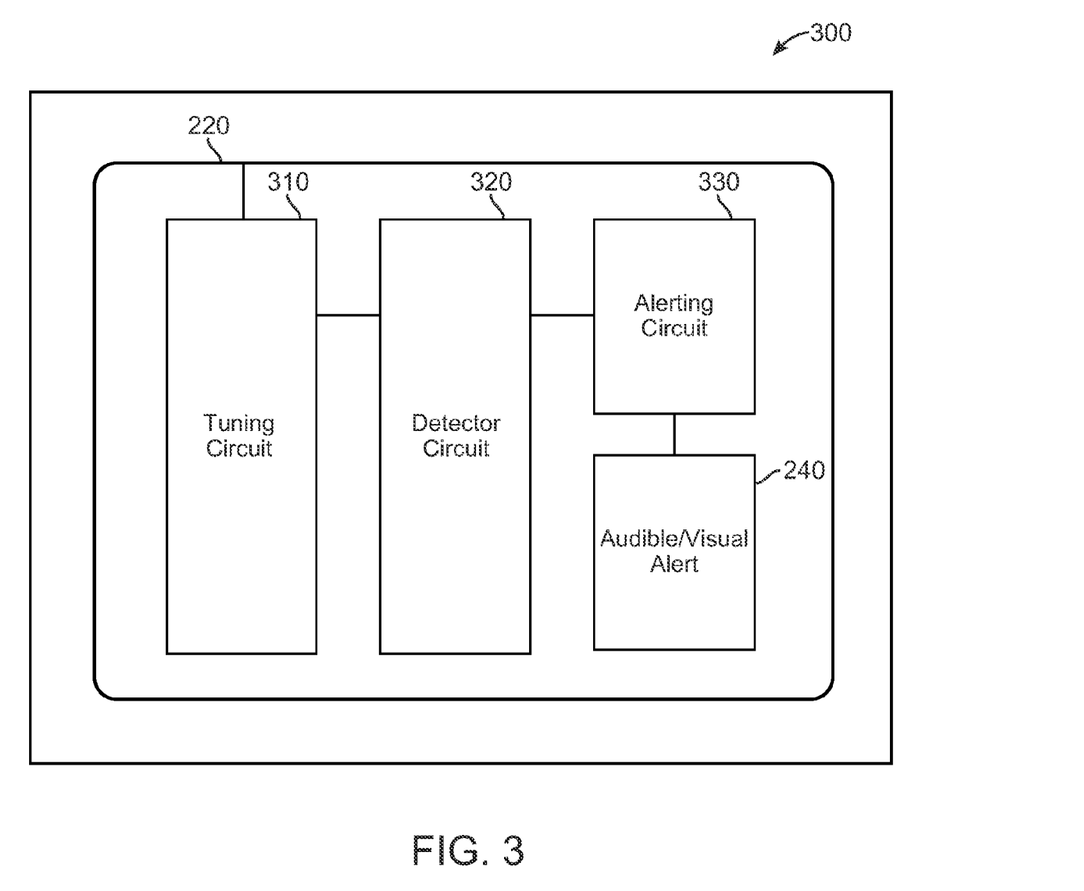
FIG. 3 is a functional block diagram of one embodiment of a card protection device.

FIG. 3 is a block diagram of an exemplary card protection device 300. Card protection device 300 can be as described in FIGS. 1-2 and some or all of elements 310-330 can be included as part of device electronics 230.

In the figure, antenna 220 is shown coupled to a tuning circuit 310. Antenna 220 can be a magnetic loop antenna having between 2-5 turns. With an etched antenna, the traces are preferably at least 1.5 mm thick to reduce impedance and improve magnetic field coupling. Tuning circuit 310 can be matched with antenna 220 and configured for sensitivity to magnetic field emissions used with contactless smartcards 110. In some embodiments, tuning circuit 310 operates with a resonant frequency slightly higher than the load-modulation capabilities of conventional smartcards. For example, tuning circuit 310 may have a resonant frequency of between 14 MHz-18 MHz for use with 13.56 MHz smartcards such as those conforming to ISO 14443 standards.

A detector circuit ("detector") 320 is coupled to tuning circuit 310. Detector 320 can be configured to detect magnetic field emissions and to store electrical energy associated with such emissions. The sensitivity of detector 320 can be based on the operating parameters of smartcards 110. For example, ISO 14443 standards require compliant cards to operate at a minimum field strength of 1.5 A/m. Testing with commercially available cards suggests that many function at levels that are below standards and some may respond to field strengths as low as 0.6 A/m. Accordingly, detector circuit 320 may implement a detection threshold of 0.6 A/m (or lower). Magnetic fields below the detection threshold may be disregarded as spurious and likely incapable of accessing smartcard data. On the other hand, card protection device 300 can respond automatically to magnetic fields that exceed the detection threshold and which therefore could be used to access card data.

Detector circuit 320 may also include an energy storage element for absorbing electrical energy associated with the field emissions. In some embodiments, card protection device 300 uses the stored electrical energy as a source of power. This may eliminate the need for batteries and can reduce overall size and manufacturing costs. Detector circuit 320 can be configured to store electrical energy from the magnetic field for a period that is related to smartcard operating capabilities. The period can be based on the time required to complete a smartcard transaction, the time required to access data from smartcard memory, the time required to authenticate card credentials, etc.

As one example, it is known that approximately 80-200 ms is required to complete a transaction with a transit fare card such as the MiFare® family of smartcards from NXP Semiconductors. Detector circuit 320 can be configured to store energy from the magnetic field for a time sufficient to provide an alert to the cardholder before such a transaction is completed. By strongly coupling with the magnetic field during a protection interval, card protection device 300 can attenuate the field strength and increase the difficulty of accessing data from nearby smartcards. After the protection interval, detector circuit 320 can optionally discontinue field attenuation. For example, when the cardholder presents his or her wallet to a card reader, the detector circuit 320 can suspend field attenuation after a warning is given.

Detector circuit 320 is coupled to an alerting circuit 330. Alerting circuit 330 generates an output signal which drives an audio/visual alerting element 340 such as piezo-electric buzzer 240, one or more light-emitting diodes (LEDs), and the like. Alerting circuit 330 can be configured to vary a rate of the output signal according to the strength of the detected magnetic field emissions. In some embodiments, the strength of magnetic field emissions is determined based on the rate at which electrical energy is stored by the storage element. When a strong magnetic field is encountered, the storage element of detector circuit 320 may charge quickly whereas, in the presence of a weak magnetic field, the storage element may charge slowly. Alerting circuit 330 can vary a tone, intensity, or beep-rate of the audible alert based on the charging rate. In this way, the cardholder can be warned when approaching an area in which suspicious fields are present.

Figure 4:
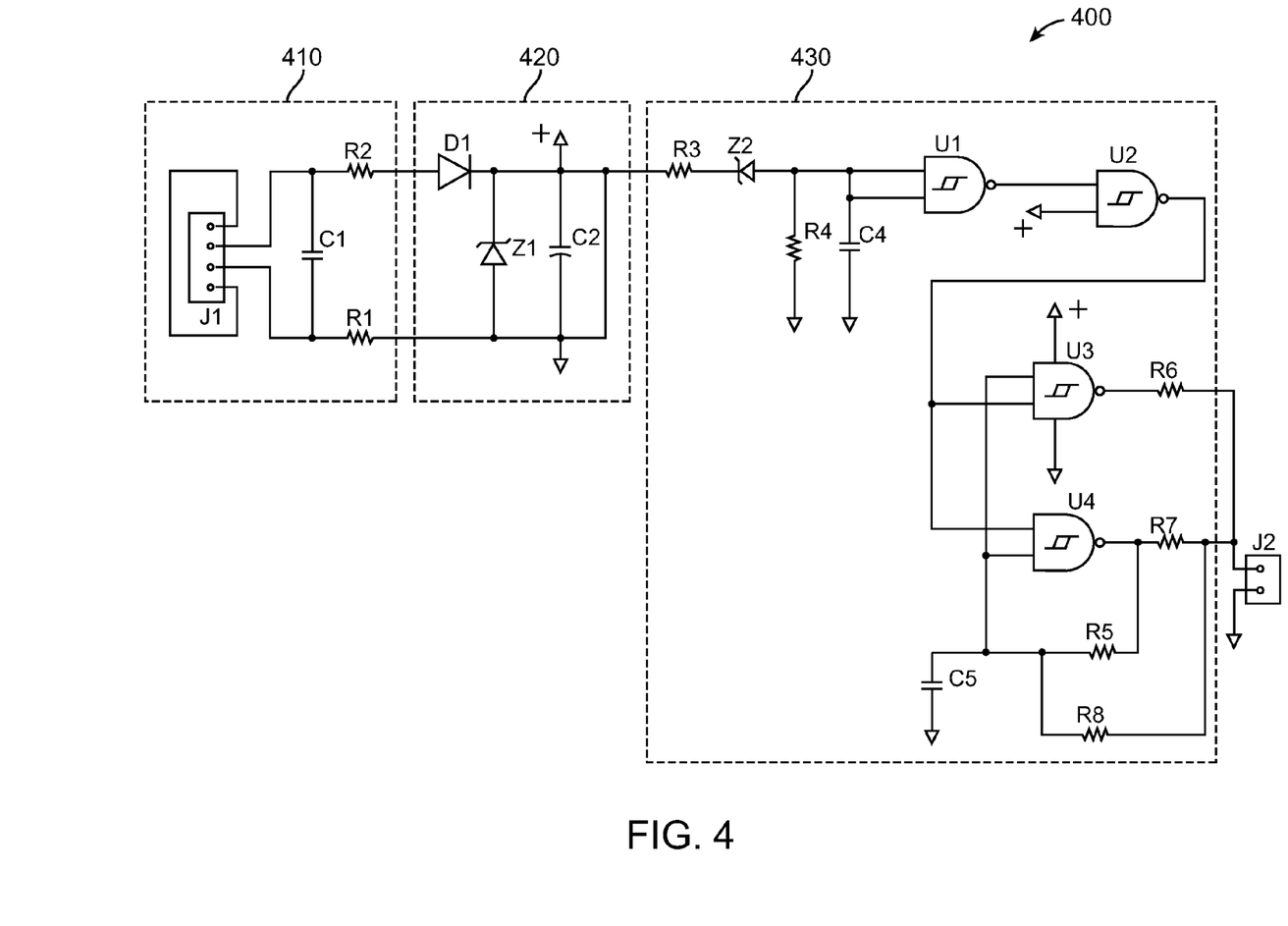
FIG. 4 is a schematic diagram of one embodiment of card protection electronics.

FIG. 4 is a schematic diagram showing aspects of exemplary card protection electronics 400. Electronics 400 can be used with the card protection devices 160, 300 and are divided into functional groups 410, 420, 430 for purposes of discussion. It will be recognized, however, that electronics 400 are illustrative only and that different components and/or circuit blocks may be used within the scope of the present invention.

Block 410 includes magnetic loop antenna (J1) and tuning circuit which is sensitive to magnetic field emissions in a frequency band used for smartcard communications. Using the inductance of the antenna coil, values of R1, R2, and C1 can be determined to form a resonance circuit sensitive that is optimized for receiving emissions in the targeted frequency band. The resonance circuit, for example, can be configured for sensitivity to 13.56 MHz emissions used with ISO 14443 cards.

The output of block 410 is connected to block 420 which can act as a detector circuit. As shown, block 420 includes a diode rectifier arrangement D1, Z1 and an energy storage capacitor C2. The rectifier diodes charge storage capacitor C2 with energy derived from the magnetic field emissions. Energy from storage capacitor C2 can be used to drive an alerting circuitry in block 430. As shown, block 430 includes a plurality of logic elements arranged so as to provide a variable driving signal to an audible alert device (J2). The driving signal can produce an audible alert which varies according to the charge rate of storage capacitor C2.

In the example circuitry, the value of storage capacitor C2 and the impedance of the resonance circuit 410 may be used to vary a charging time of the detector circuit 430. The charging time of the detector circuit, in combination with a power consumption of the audible alert element J2, determines how much the magnetic field will be loaded when the storage capacitor C2 is fully charged. As a result, component values of R1, R2, C1, and C2 may be selected to vary the amount and duration by which the magnetic field is attenuated according to card operating requirements and access times as previously discussed.

Figure 5:
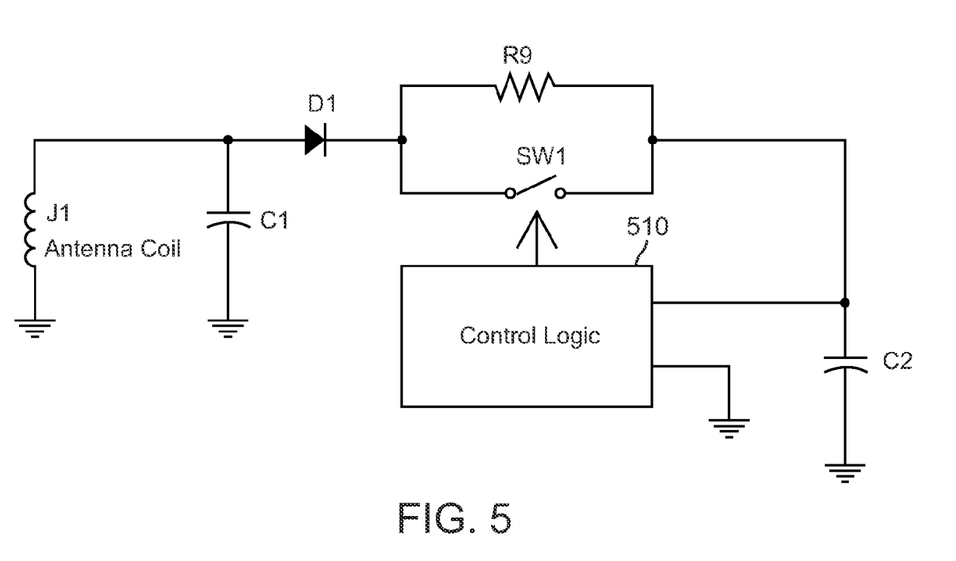
FIG. 5 shows exemplary control logic such as can be used with the card protection electronics of FIG. 4.

FIG. 5 shows exemplary control logic for changing a magnetic field loading characteristic of card protection electronics 400. As shown, the input of a control logic element 510 is coupled to the storage capacitor C2 of block 420. The output of control logic 510 operates a switching element SW1 which is added in parallel with resistor R9 and coupled with the diode D1 and storage capacitor C2 as shown in blocks 410, 420.

When storage capacitor C2 reaches a predetermined voltage level, control logic 510 opens switching element SW1. This, in turn, reduces a load on the magnetic field and may facilitate the interaction of collocated smartcards 110 with a card reader. Component values of R1, R2, and C2 are selected such that the charge on storage capacitor C2 is sufficient to drive audible alert J2 without discharging by more than approximately 10%. As a result, the magnetic field can be attenuated for a time sufficient to provide an audible alert and then reduced once the alert is given. This, in turn, allows the cardholder to use a protected smartcard 110 to complete a transaction.

Figure 6:
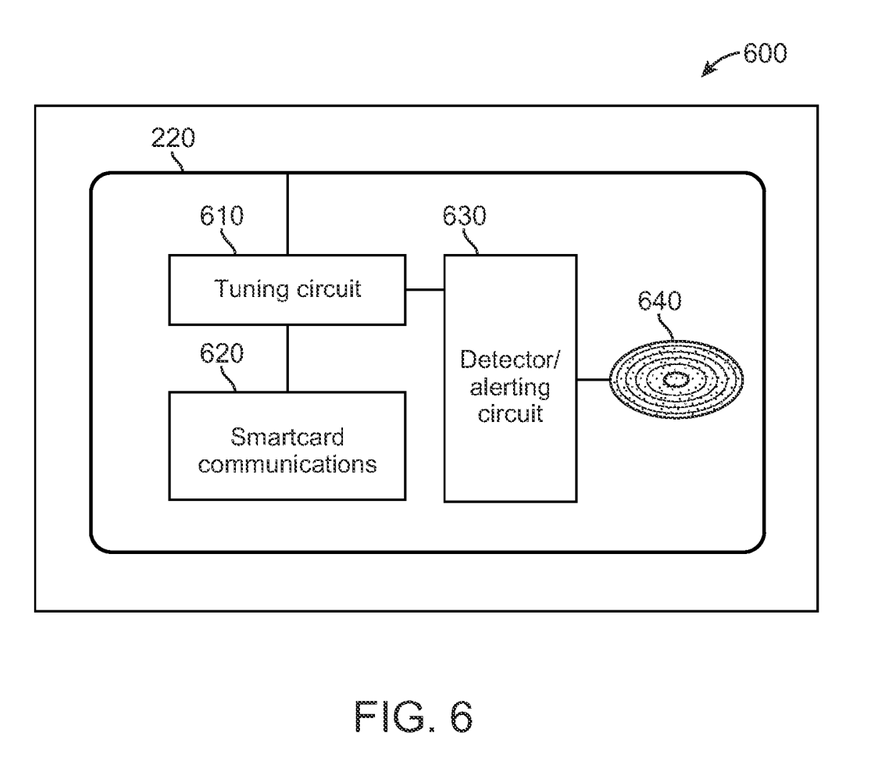
FIG. 6 shows a further embodiment of a card protection device.

FIG. 6 shows another embodiment of a card protection device 600. Card protection device 600 adds protection capabilities to a conventional smartcard device. As shown, a tuning circuit 610 is coupled to a magnetic loop antenna 220. The tuning circuit can be as described in connection with FIG. 3 and is configured to detect magnetic field emissions in a frequency band used for smartcard communications.

Tuning circuit 610 is also coupled to a smartcard communications module 620 and a detector/alerting circuit 630 ("detector"). Communications module 620 can be an integrated circuit or other component used with smartcards 110 to control magnetic field load-modulation. For example, communication module 620 can be an application-specific integrated circuit (ASIC) such as those used in contactless credit cards, fare cards, bank cards, access control cards, and the like. Detector/alerting circuit 630 is coupled to an alerting device 640 such as the piezo-electric buzzer 240 shown in FIG. 2. With this arrangement, the magnetic loop antenna 220 and tuning circuit 610 are shared by smartcard communications module 620 and protection electronics 630, 640.

In operation, tuning circuit 610 passes a current induced by the external magnetic field emissions to detector 630. Detector 630 can implement a detection threshold related to the operating characteristics of smartcard communications module 620. For example, when smartcard communications module 620 is used with transit systems, such as a MiFare card, the detection threshold may be set to 1.0 A/m, 0.6 A/m, or some other value related to its minimum operating level. When an external magnetic field exceeds the established threshold, detector 630 outputs an alerting signal which drives alerting device 640. As described in connection with FIG. 2 and FIG. 3, detector 630 can be powered by energy from the external magnetic field emissions and may vary the alerting signal according to field strength, charge rate, or other factors.

Additionally, detector 630 can implement a protection threshold for attenuating the magnetic field based on the communications protocol of smartcard communications module 620. When paired with an ISO 14443 card, for example, detector 630 may include the protection electronics of FIG. 4 and the control logic of FIG. 5 configured so as to strongly attenuate magnetic field strength for a period that is based on the time required to conduct a ticketing transaction or other payment using the card data. With MiFare cards, for example, by disrupting the field for approximately 50 ms, it may be possible to frustrate the handshaking process and require a hacker to repeat a command sequence or initiate a new transaction. While the magnetic field is disrupted, detector 630 can raise an alarm at alerting device 640 to warn the cardholder of an authorized attempt to access card data. After the protection interval, or when an alarm having a predetermined duration has been given, the attenuation can be suspended by operation of control logic 510 or in some other manner.

Figure 7:
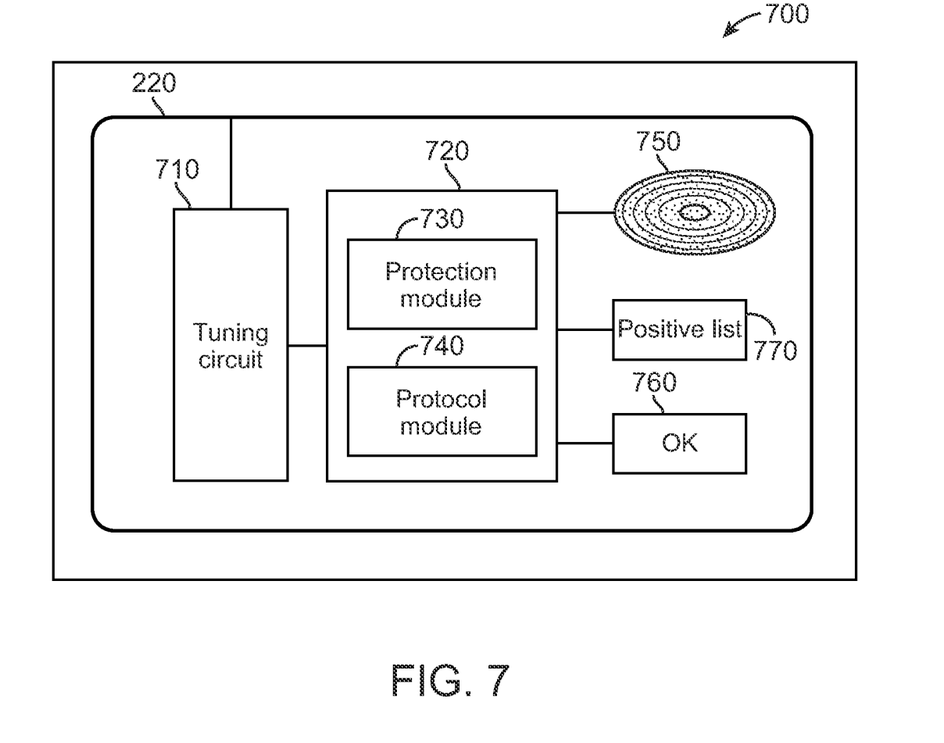
FIG. 7 shows an embodiment of a smartcard device having protection capabilities.

FIG. 7 shows an embodiment of a smartcard device 700. Smartcard 700 integrates protection and alerting functions with conventional smartcard communications. In this example, a tuning circuit 710 is coupled to a magnetic loop antenna 220 disposed on a card substrate. Tuning circuit 710 can be as described in connection with FIG. 3 and is configured to detect magnetic field emissions in a frequency band used for smartcard communications. Tuning circuit 710 is also coupled to modules 720.

Modules 720 can include one or more application specific integrated circuits and supporting electronics. The ASICs can include protocol modules 740 used for exchanging commands and data with card readers. The ASICs may also include registers and the like for storing account numbers and other types of card data used to perform transactions. One or more protection modules 730 can be coupled to and interact with the protocol modules 740 to enable a fine grained control over card-based communications.

As with other embodiments, protection module 730 can be configured to detect magnetic field emissions and to generate an alerting signal which drives an audible and/or visual alert element 750. The alert element 750 can be a buzzer, one or more light emitting diodes (LEDs), and the like. Based upon information from the protocol modules 740, protection module 730 can analyze the magnetic field emissions to reduce the number of false alarms. For example, RF fields that do not conform with a particular CSC protocol can be ignored without raising an alarm.

In a first operating mode, protection module 730 may disable operation of protocol module 740 to prevent access to card data. The card may remain in the first operating mode with communications disabled until a user input is received. As shown, an OK button 760 is provided to reset operation of the protocol modules 740 when a suspicious access attempt is detected. When the OK button is pressed, protection module 730 clears the alarm condition and smartcard 700 transitions to a second operating mode in which the cardholder can proceed with an authorized transaction.

In some embodiments, card protection device 700 includes one or more additional storage elements 770. The additional storage element 770 can include information such as a positive list used by protection module 730 to allow access to card data. The positive list 770 may identify card readers that are allowed to communicate with the card. When an access attempt is detected, protection module 730 can compare a device identifier of the card reader to the positive list 770. If the identifier is not found in the positive list 770, access to card data can be prevented and protection module 730 can enter the first operating mode and begin generating an alerting signal. In addition to an audible alert, an LED or other indicator of card protection device 700 can be used to signal that fraudulent access was detected and blocked. The cardholder may then be required to press OK button 760 to reset device operation.

Figure 8:
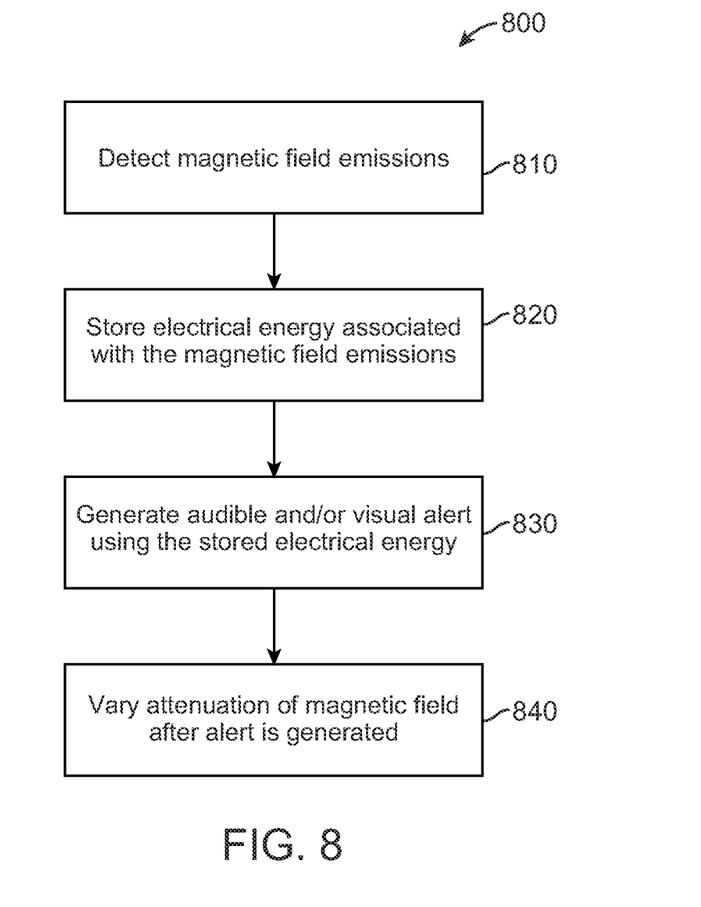
FIG. 8 shows one embodiment of a process for protecting smartcard data.

FIG. 8 is an exemplary process 800 such as can be carried out by a card protection device. Process 800 may be implemented with protection electronics such as shown in FIG. 3 or FIG. 4. Alternatively, process 800 can be performed by one or more modules such as the application specific integrated circuits described in connection with FIG. 7, or in some other manner.

At block 810, magnetic field emissions are detected. The magnetic field emissions can be broad spectrum or in a frequency band used for smartcard communications. At block 820, the card protection device stores energy associated with emissions. The stored energy can be used to power the card protection device and can provide an indication of the strength of the magnetic field. In various embodiments, field energy is stored in a capacitor and a charge or voltage level of the capacitor is monitored for alerting. If the charge or voltage level does not exceed a threshold related to card operating levels, the card protection device may disregard the field and suppress alerting functions.

When the charge or voltage level exceeds a card operating threshold, block 830, the stored energy can be used to generate an audible and/or visual alert. The alert may be varied based on field strength which can provide an indication of the cardholder's proximity to the transmitter. For example, the tone or beep-rate of an audible signal may change as the cardholder moves in relation to a transmitter. When the card is presented at a card reader, the alert is expected and can be ignored. However, when a hacker attempts to access card data, the alert serves as a warning to the cardholder.

At block 840, the card protection device varies the amount by which the magnetic field is attenuated. This can involve varying an impedance of the protection circuit such that the magnetic field is heavily loaded for an interval while an alert is sounded. Following the alert, the impedance may be changed so as to enable normal functioning of smartcards. Loading the magnetic field may increase the power required to activate nearby smartcards and potentially frustrate a hacker's attempt to access card data.

The duration of the loading interval may be based on the time required to access card data under real-world conditions. Components values of the protection electronics may be selected accordingly. For example, the loading duration may be set to approximately 50 ms assuming a field strength of 2 A/m at a range of 8-30 cms. After an alert has been given, the card protection device may reduce or discontinue loading the field to permit normal card operation. For example, control logic can be used to adjust device impedance so that data can be accessed normally from nearby cards. Many variations in components and control logic functioning can be made to adapt the protection device to card operating characteristics within the scope of the present invention.

Figure 9:
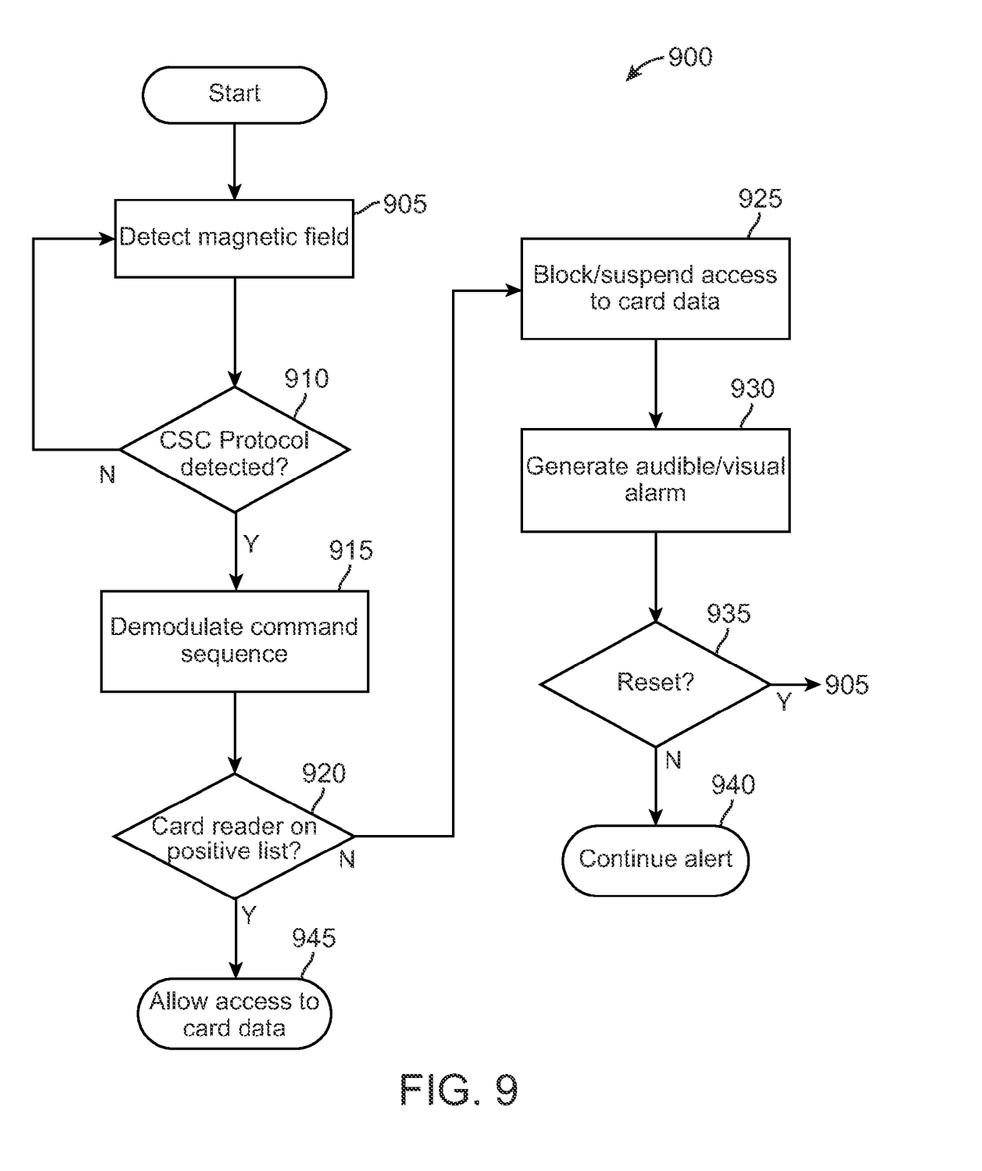
FIG. 9 shows an embodiment of a process for controlling access to smartcard data.

FIG. 9 is an exemplary process 900 such as can be carried out by a smartcard device. Process 900 may be implemented by modules 720 as described in connection with FIG. 7, or other embodiments in which card alerting and protection is integrated with communications and data access capabilities.

At block 905, a magnetic field is detected. Detecting the field may be based initially on field strength. For example, processing may continue to block 910 only when the field strength exceeds the minimum operating level of a conventional smartcard device. At block 910, the smartcard device determines whether the field is appropriate for communicating with a smartcard. This may include determining whether frequency, amplitude, modulation, and other field characteristics comply with smartcard communication protocols. Emissions which are incompatible with smartcard operation can be disregarded to reduce the likelihood of false alarms.

When a smartcard protocol is detected, it can be demodulated and analyzed at block 915. For example, before access to card data is permitted, one or more protocol modules of an integrated circuit may demodulate the magnetic field to obtain an identifier associated with the card reader. Using the identifier, a determination is made at block 920 as to whether the card reader is found on a list of valid devices. If the card reader is found on the positive list, block 945, access to card data is permitted and the transaction can continue. For example, when the identifier is validated by a positive list, a transition to the second operating mode may occur and normal card-based authentication and encryption routines can be allowed to proceed. On the other hand, if the identifier is not found on the positive list, access to card data can be prevented at block 925. At block 930, an audible and/or visual alert can be generated. The alert may continue, block 940, until operation of the smartcard device is reset at block 935.

As will be understood by those skilled in the art, the present invention may be embodied in other specific forms. Those skilled in the art will recognize, or be able to ascertain using no more than routine experimentation, many equivalents to the specific embodiments of the invention described herein. Such equivalents are intended to be encompassed by the following claims.

What is claimed is:

1. A detection and warning device for card protection, comprising:
an antenna comprising a tuning circuit responsive to magnetic field emissions in a frequency band associated with contactless smartcard communications;
a detector circuit coupled to the antenna and controlled by control logic, the detector circuit configured to attenuate the magnetic field emissions in a vicinity of a contactless smartcard for a predetermined amount of time, wherein the amount of time is determined according to smartcard operating characteristics and is based on an amount of time needed to access data from the contactless smartcard when accessing the data in accordance with a communication protocol, wherein the detector circuit is configured to attenuate the magnetic field emissions by temporarily storing energy associated with the magnetic field emissions, and wherein the control logic is configured to cause the detector circuit to discontinue attenuating the magnetic field emissions upon attenuation of the magnetic field emissions having lasted for the amount of time; and
an alerting circuit configured to provide an audible alert powered by the stored energy of the detector circuit.

2. The card protection device of claim 1, wherein the antenna comprises a magnetic loop and the tuning circuit has a resonant frequency adapted to the frequency band of the smartcard communications.

3. The card protection device of claim 1, wherein the alerting circuit is configured to provide the audible alert in response to the magnetic field emissions exceeding a threshold value.

4. The card protection device of claim 3, wherein the threshold value is based on a level of the stored energy.

5. The card protection device of claim 1, wherein the frequency band comprises an operating frequency of contactless smartcards specified by ISO 14443 standards.

6. The card protection device of claim 1, wherein the alerting circuit comprises a piezo-electric buzzer.

7. The card protection device of claim 6, wherein the alerting circuit is configured to vary the audible alert according to a strength of the magnetic field emissions.

8. The card protection device of claim 7, wherein the alerting circuit is configured to vary the audible alert according to a rate at which the energy associated with the magnetic field is stored.

9. The card protection device of claim 1, wherein a size of the card protection device is determined according to ISO/IEC 7810 standards.

10. A method of detecting access to a contactless smartcard, comprising:
attenuating magnetic field emissions in a vicinity of a contactless smartcard for a duration of time needed to access data from a contactless smartcard when accessing the data in accordance with a contactless smartcard communication protocol, and wherein attenuating the magnetic field emissions is done by temporarily storing electrical energy associated with the magnetic field emissions at a detecting device;
generating an audible alert responsive to the magnetic field emissions, wherein the audible alert is powered by the stored electrical energy; and
discontinuing attenuation of the magnetic field emissions upon attenuation of the magnetic field having lasted for a predetermined amount of time.

11. The method of claim 10 wherein the contactless smartcard communication protocol is specified by ISO 14443 standards, and the time is 50 milliseconds.

12. The method of claim 10, wherein attenuating the magnetic field emissions comprises varying an impedance of the detecting device.

13. The method of claim 10, further comprising varying the audible alert based on a strength of the magnetic field emissions.

14. The method of claim 10, further comprising:
   detecting a level of the magnetic field emissions; and
   generating the audible alert in response to the level of the magnetic field emissions exceeding a threshold value.

15. The method of claim 14, wherein the threshold value corresponds to an amount of the stored electrical energy.

16. A detection and alerting device for smartcard protection, comprising:
   an antenna configured to receive magnetic field emissions in a frequency band used for communication with a card reader;
   a detector circuit coupled to the antenna and configured to store energy associated with the magnetic field emissions;
   an attenuation module configured to:
   attenuate the magnetic field emissions in a vicinity of a contactless smartcard for a predetermined amount of time; and
   discontinue attenuating the magnetic field emissions upon attenuation of the magnetic field emissions having lasted for the amount of time;
   a communications module coupled to the antenna and configured to modulate the magnetic field emissions according to a contactless smartcard communication protocol, wherein the detector circuit is configured to suspend operation of the communication module for a predetermined time; and
   an alerting circuit configured to generate an audible alert responsive to the magnetic field emissions using the stored energy of the detector circuit.

17. The smartcard device of claim 16, wherein the detector circuit is configured to detect a modulation of the magnetic field emissions according to the contactless smartcard communication protocol, and the alerting circuit is configured to generate the audible alert when the modulation is detected.

18. The smartcard device of claim 16, wherein the antenna comprises a tuning circuit responsive to the frequency band used for communication with the card reader.

19. The smartcard device of claim 16, wherein the alerting circuit is configured to control a frequency or duration of the audible alert.

20. A smartcard device, comprising:
   an antenna configured to receive magnetic field emissions in a frequency band used for communication with a contactless smartcard reader; and
   an integrated circuit coupled to the antenna and configured to detect a modulation of the magnetic field emissions according to a contactless smartcard communication protocol, the integrated circuit being further configured to:
   attenuate the magnetic field emissions for a predetermined amount of time by temporarily storing energy associated with the magnetic field emissions, wherein the amount of time is longer than a time needed to access data from the smartcard device based on the smartcard communication protocol; and
   discontinue attenuating the magnetic field emissions upon attenuation of the magnetic field emissions having lasted for the amount of time;
   generate an audible alert responsive to the magnetic field emissions in a first operating mode and to load modulate the magnetic field emissions in a second operating mode, and transition from the first operating mode to the second operating mode after a predetermined time.

21. The smartcard device of claim 20, wherein the integrated circuit is configured to suspend load modulation of the magnetic field emissions in the first operating mode.

22. The smartcard device of claim 20, further comprising an external interface configured to receive a user input, and wherein the integrated circuit exits the first operating mode when the user input is received at the external interface.

23. The smartcard device of claim 20, further comprising a piezo-electric buzzer configured to receive an alert signal from the integrated circuit and to generate the audible alert in response to the alert signal.

24. The smartcard device of claim 23, wherein the integrated circuit is configured to vary the alert signal according to a strength of the magnetic field emissions.

* * * * *

UNITED STATES PATENT AND TRADEMARK OFFICE
CERTIFICATE OF CORRECTION

PATENT NO.        : 8,902,073 B2
APPLICATION NO.   : 12/702170
DATED             : December 2, 2014
INVENTOR(S)       : Thomas Busch-Sorensen It is certified that error appears in the above-identified patent and that said Letters Patent is hereby corrected as shown below:

In the Claims:

Column 12, line 15, please delete "," and insert --;--.

Signed and Sealed this
Seventh Day of April, 2015

Michelle K. Lee
*Director of the United States Patent and Trademark Office*